No. 682,212. Patented Sept. 10, 1901.
E. J. LUTWYCHE.
MOLD FOR BLOWN GLASS.
(Application filed Oct. 17, 1900.)
(No Model.) 2 Sheets—Sheet 1.
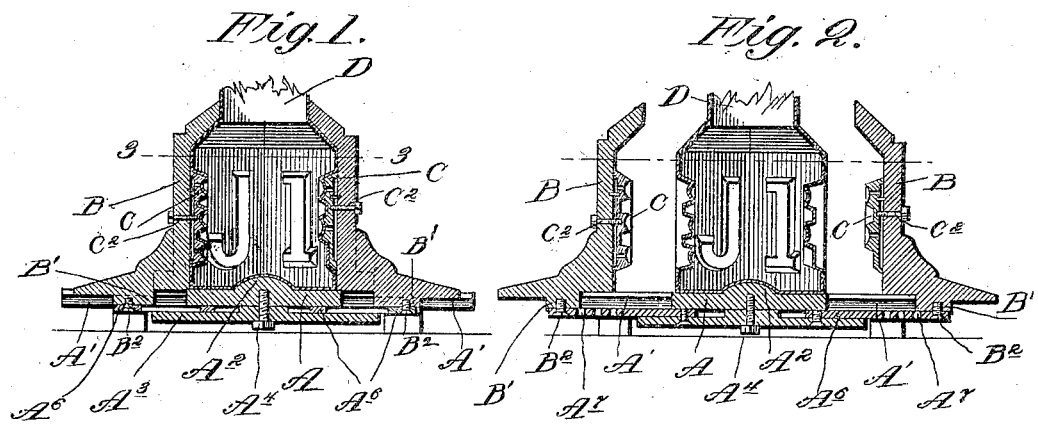
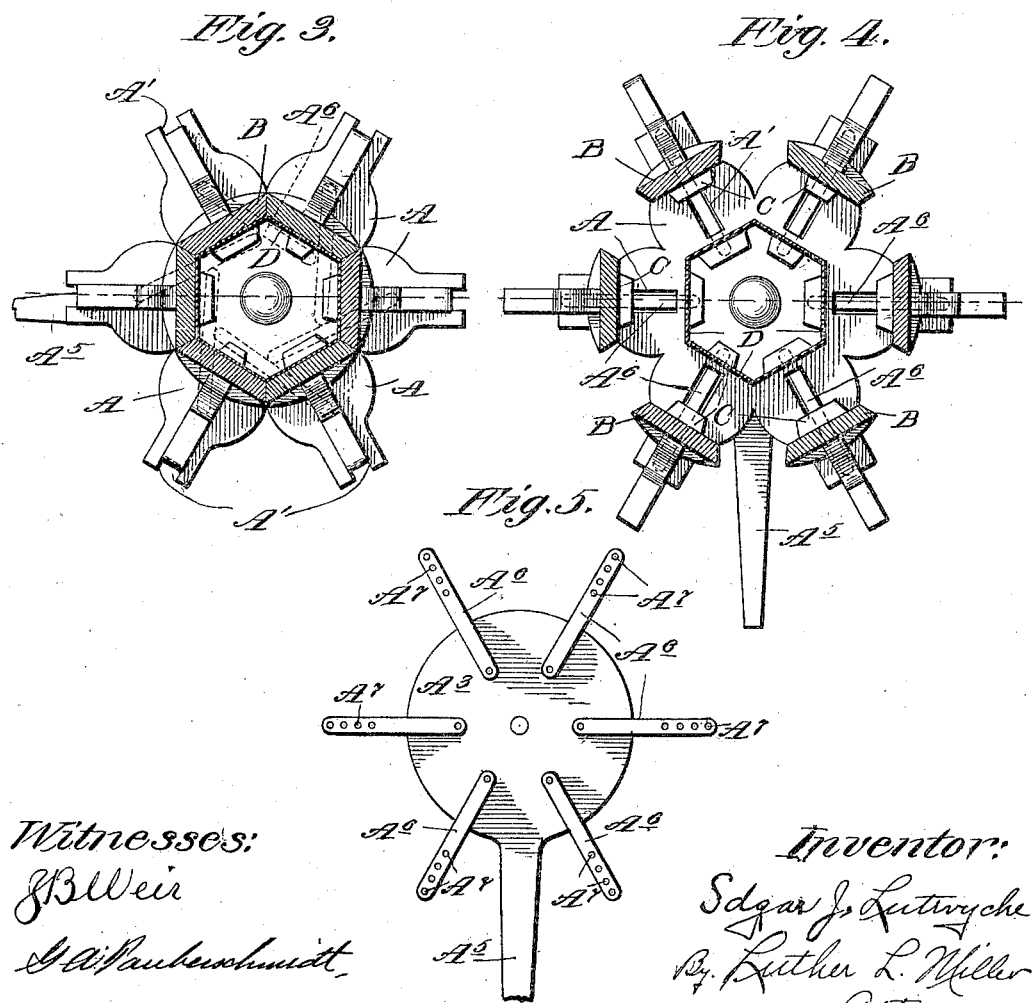

No. 682,212. Patented Sept. 10, 1901.
E. J. LUTWYCHE.
MOLD FOR BLOWN GLASS.
(Application filed Oct. 17, 1900.)
(No Model.) 2 Sheets—Sheet 2.
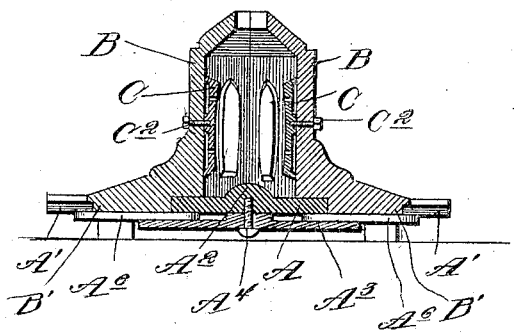
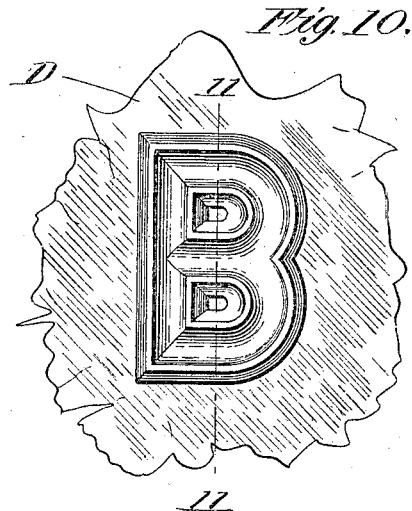
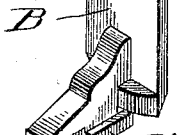
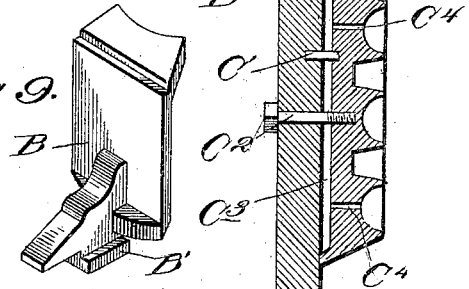
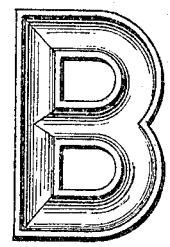
Witnesses:
G. A. Raubenschmidt
H. S. Gutter
Inventor:
Edgar J. Lutwyche
By Luther L. Miller
Atty.
THE NORRIS PETERS CO., PHOTO-LITHO., WASHINGTON, D. C.

UNITED STATES PATENT OFFICE.

EDGAR J. LUTWYCHE, OF CHICAGO, ILLINOIS.

MOLD FOR BLOWN GLASS.

SPECIFICATION forming part of Letters Patent No. 682,212, dated September 10, 1901.

Application filed October 17, 1900. Serial No. 33,393. (No model.)

*To all whom it may concern:*

Be it known that I, EDGAR J. LUTWYCHE, a citizen of the United States, residing at Chicago, in the county of Cook and State of Illinois, have invented certain new and useful Improvements in Molds for Blown Glass, of which the following is a specification.

The usual way of forming small flat glass articles is by "pressing," wherein molten glass is poured into heated molds and pressed therein; but where it is necessary that the article be composed of a thin sheet of the material the pressing process is impracticable, and the article must be formed by blowing. This is done by blowing a "bottle" of plastic glass within a separable mold having patterns on its interior walls; and the object of this invention is the production of an improved mold for this purpose and the perfection of a process for producing flat articles from blown glass.

In the embodiment herein shown of this invention a casing of six sides is produced, and these sides are separable radially from the center by the movement of a single handle to permit the opening of the mold and the withdrawal of the blown bottle. The patterns for the articles to be formed are secured to the sides composing the mold, and when the bottle is expanded in the mold by blowing the glass composing the walls of the bottle conforms to the face of each pattern. As the charge for glass-blowing is based upon the gross amount of glass blown, it is desirable that the quantity of "waste" be as little as possible, and therefore I have provided sides for the mold of different widths and heights to accommodate the size of their inner faces to that of the pattern. Sets of sides of different sizes may be used upon one base-plate, those of one size being removed and those of another inserted in their radial bearing-grooves in said base-plate.

In the accompanying drawings, Figure 1 is a vertical central section showing my improved mold with patterns upon the inner faces of its sections, also representing a glass bottle blown to completely fill the mold. Fig. 2 is a view similar to that shown in the preceding figure, excepting that the sections comprising the mold are slid back to permit the removal of the blown glass bottle. Fig. 3 is a horizontal section through the mold on dotted line 3 3 of Fig. 1. Fig. 4 is a plan view of the mold with the sections composing its sides withdrawn. Fig. 5 is a view of the oscillatory under plate with its operating-handle and pivotal links for connecting the plate with each of the sections in order that the oscillation of said plate shall produce a synchronous reciprocation of each of the sections. Fig. 6 is a vertical central section through the mold, showing it as made up of narrow sections. Figs. 7, 8, and 9 are views of sections of different sizes. Fig. 10 is a view of a fragment of the glass bottle formed within the mold. Fig. 11 is a transverse section on dotted line 11 11 of Fig. 10. Fig. 12 is a view of a letter after the same has been cut away from the surrounding glass of the bottle. Fig. 13 is a transverse vertical section through said letter, and Fig. 14 is a transverse vertical section through the pattern upon which said letter was produced.

Like letters of reference indicate corresponding parts throughout the several views.

In the production of this mold I provide a base-plate A, having the radial grooves A' therein. A central boss A$^2$ is formed integral with the base-plate A, its purpose being to retain the glass bottle centrally when the sections are radially withdrawn. A plate A$^3$ is pivotally secured to the under side of the base-plate A by means of the pivotal bolt A$^4$. This plate has an operating-handle A$^5$ secured thereto and is provided with the links A$^6$, pivotally secured at their inner ends to the upper side of said plate and at their outer ends having several perforations A$^7$, by means of which a pivotal connection is had between each link and one of the sections of the mold. B is one of said sections, having the lower portion B' adapted to slide within one of said grooves A'. This portion is adapted to receive a bolt B$^2$ for connecting one of the links A$^6$ at its outer end with said section B. These sections may be made of different widths and heights, but all are adapted to slide in the grooves A' of the base-plate A.

C is a pattern, in this instance for the production of the letter "B."

C' is a pin adapted to enter coinciding openings in the face of the section B and the rear side of the pattern C, and C² is a bolt, which pin is intended to prevent the pattern from turning, and the bolt is to hold it against the inner face of its section B. An air-chamber C³ is formed in the under side of the pattern C, and vents C⁴ are provided, communicating between the depressions in the pattern and said air-chamber. These vents are intended to permit the escape of air from the face of the pattern, so that bubbles shall not be formed in the finished article. The capacity of the air-chamber C³ is such that with the usual pressure in blowing the air confined within the chamber will cushion the glass in the face of the pattern and prevent it from entering the vents C⁴.

D is the glass bottle incidentally produced in blowing glass into the patterns C within the mold. The patterns C are made to stand out a considerable distance from the face of the sections B, so that the glass around the edges of the pattern shall be quite thin, and thus easily breakable in separating the article from the bottle. In practical use patterns for the desired letters or other articles are secured to the inner faces of the sections B and the mold closed, as shown in Figs. 1 and 3. The whole mold, being made of metal, is heated and the glass-blower inserts the end of a blowing-tube, with plastic glass thereon, into the open upper end of the mold and by blowing into said tube expands the bottle of plastic glass, so that it wholly fills the interior of said mold, entering all the depressions in the faces of the patterns C. When the bottle is blown, it is thus a six-sided glass receptacle, having on each of its faces letters corresponding to the patterns fixed on the inside of the mold. This glass receptacle is then broken to separate the letters and the waste glass broken away as much as safely can be done from the letters or articles, as illustrated in Figs. 10 and 11. Each of these pieces of glass bearing the letters or other articles is then placed face downward in a similar pattern upon the bed of a grinding-machine and its rear side ground away until the letter is separated from the surrounding waste material. It is then ready for gilding or other ornamenting.

While I have shown letters, it is clear that any similar article may be formed in the manner described.

I claim as my invention—

1. In a separable glass-mold, in combination, a base-plate having a number of radial grooves therein; sections comprising the body portion of said mold, adapted to move along said grooves, said sections having portions projecting into said grooves, and adapted to slide therein; an oscillatory plate pivotally mounted on the lower side of said base-plate concentric with said radial grooves; links having a pivotal connection with said oscillatory plate; a pivotal bolt for connecting the outer ends of said links with the lower projecting portions of said sections; and a handle for moving said oscillatory plate upon its pivotal center, and for moving said sections lengthwise in said grooves toward and from one another.

2. In a separable glass-mold, in combination, a base-plate having radial grooves therein; a plurality of sections, each section having a portion projecting into said grooves, adapted to slide lengthwise thereof, said sections being of such width as to touch each other at their edges when they are slid toward the center of said base-plate, and thereby form the inclosed body portion of said mold; an oscillatory plate pivotally mounted on the lower side of said base-plate concentric with said radial grooves; a link pivotally connected to said oscillatory plate; a pivotal bolt for connecting the outer ends of said links with the lower projecting portion of each of said sections; and a handle for oscillating said plate on its supporting-pivot and moving said sections toward and from one another along said radial grooves.

3. A pattern for glass-molds, having a body portion, a recess in the rear side thereof, and vent-holes connecting the depressions in the face of said pattern with said recess, to permit the escape of air from said depressions, said recess being closed to the outer air except for said vent-holes.

4. A pattern for glass-molds, having a body portion, a recess in the rear side thereof, and vent-holes connecting the depressions in the face of said pattern with said recess, to permit the escape of air from said depressions, said recess being closed to the outer air except for said vent-holes, and having a capacity such that with the usual pressure in blowing the glass into the mold the air confined within the chamber will cushion the glass in the face of the pattern, and prevent it from entering the vent-holes in the face of said pattern.

EDGAR J. LUTWYCHE.

Witnesses:
GEO. L. CHINDAHL,
L. L. MILLER.